(12) United States Patent
Ohhashi

(10) Patent No.: US 7,149,172 B2
(45) Date of Patent: Dec. 12, 2006

(54) INFORMATION RECORDING APPARATUS, AN INFORMATION RECORDING METHOD, A PROGRAM, A RECORDING MEDIUM, AND AN INFORMATION RECORDING SYSTEM

(75) Inventor: Naoya Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 10/446,116

(22) Filed: May 28, 2003

(65) Prior Publication Data

US 2003/0231568 A1 Dec. 18, 2003

(30) Foreign Application Priority Data

Jun. 17, 2002 (JP) ............... 2002-175851

(51) Int. Cl.
 *G11B 7/00* (2006.01)
(52) U.S. Cl. ............... 369/59.25; 369/53.22; 369/275.3

(58) Field of Classification Search ............. 369/59.25, 369/53.22, 275.3
See application file for complete search history.

(56) References Cited

U.S. PATENT DOCUMENTS 5,838,658 A * 11/1998 Nakane et al. ........... 369/275.4
2002/0172117 A1 * 11/2002 Sako et al. .............. 369/53.29
2003/0067859 A1 * 4/2003 Weijenbergh et al. ... 369/59.25

* cited by examiner

*Primary Examiner*—Wayne Young
*Assistant Examiner*—Van T. Pham
(74) *Attorney, Agent, or Firm*—Dickstein Shapiro LLP

(57) ABSTRACT

An information recording apparatus is capable of recording data and management information of an information recording medium in a plurality of data recording formats. Typically, a DVD+RW is considered to be a DVD+R disk, when data and management information of the DVD+R are recorded on the DVD+RW disk in the data recording format for the DVD+R disk, such as the sequential writing method and the multi-session writing method.

13 Claims, 13 Drawing Sheets

FIG.2

| Physical Sector of ECC block | Main Data Byte position | Description | Number Of bytes |
|---|---|---|---|
| 0 | $D_0$ to $D_3$ | Content Descriptor | 4 |
| 0 | $D_4$ to $D_7$ | Unknown Content Descriptor Actions | 4 |
| 0 | $D_8$ to $D_{39}$ | Drive ID | 32 |
| 0 | $D_{40}$ to $D_{41}$ | Session number | 2 |
| 0 | $D_{42}$ to $D_{63}$ | Reserved and set to (00) | 22 |
| 0 | $D_{64}$ to $D_{95}$ | Disc ID(in Lead-in Zone only) | 32 |
| 0 | $D_{96}$ to $D_{127}$ | Application Dependent | 32 |
| 0 | $D_{128}$ to $D_{143}$ | Session Item 0 | 16 |
| 0 | ... | ... | |
| 0 | $D_{128+i\times16}$ to $D_{143+i\times16}$ | Session Item i | 16 |
| 0 | ... | ... | |
| 0 | $D_{128+i\times16}$ to $D_{143+(N-1)\times16}$ | Session Item N-1 | 16 |
| 0 | $D_{128+N\times16}$ to $D_{2047}$ | Reserved and set to (00) | 1920-N×16 |
| 1 to 15 | $D_0$ to $D_{2047}$ | Reserved and set to (00) | 15×2048 |

FIG.3

| Item byte Position | Description | Number Of bytes |
|---|---|---|
| $B_0$ to $B_2$ | Fragment item descriptor | 3 |
| $B_3$ to $B_4$ | Fragment number | 2 |
| $B_5$ to $B_7$ | Fragment start address | 3 |
| $B_8$ to $B_{10}$ | Fragment end address | 3 |
| $B_{11}$ to $B_{15}$ | Reserved and set to (00) | 5 |

FIG.4

| Item byte Position | Description | Number Of bytes |
|---|---|---|
| $B_0$ to $B_2$ | Previous Session item descriptor | 3 |
| $B_3$ | Reserve and set to (00) | 1 |
| $B_4$ | Previous Session number | 1 |
| $B_5$ to $B_7$ | Previous Session start address | 3 |
| $B_8$ to $B_{10}$ | Previous Session end address | 3 |
| $B_{11}$ to $B_{15}$ | Reserved and set to (00) | 5 |

FIG.5

| Physical Sector of ECC block | Main Data Byte position | Description | Number Of bytes |
|---|---|---|---|
| 0 | $D_0$ to $D_3$ | Content Descriptor | 4 |
| 0 | $D_4$ to $D_7$ | Unknown Content Descriptor Actions | 4 |
| 0 | $D_8$ to $D_{39}$ | Drive ID | 32 |
| 0 | $D_{40}$ to $D_{43}$ | FDCB update count | 4 |
| 0 | $D_{44}$ to $D_{47}$ | Formatting status and mode | 4 |
| 0 | $D_{48}$ to $D_{51}$ | Last written address | 4 |
| 0 | $D_{52}$ to $D_{55}$ | Last verified address | 4 |
| 0 | $D_{56}$ to $D_{59}$ | Bitmap Start Adress | 4 |
| 0 | $D_{60}$ to $D_{63}$ | Bitmap Length | 4 |
| 0 | $D_{64}$ to $D_{95}$ | Disc ID | 32 |
| 0 | $D_{96}$ to $D_{127}$ | Application dependent | 32 |
| 0 | $D_{128}$ to $D_{2047}$ | Reserved and set to (00) | 1920 |
| 1 to 9 | $D_0$ to $D_{2047}$ | Formatting Bitmap | 9x2048 |
| 10 to 15 | $D_0$ to $D_{2047}$ | Reserved and set to (00) | 6x2048 |

FIG.6

| | Description | Nominal radius in mm | PSN of the first Physical Sector | Number Of Physical Sector |
|---|---|---|---|---|
| Inner Drive Area | Initial Zone | start 22,000mm | ... | blank |
| | Inner Disc Test Zone | start 22,643mm | (023480) | 16384 |
| | Inner Disc Count Zone | start 23,079mm | (027480) | 4096 |
| | Inner Disc Administration Zone | start 23,186mm | (028480) | 4096 |
| | Table of Contents Zone | start 23,293mm | (029480) | 4096 |
| Lead-in | Guard Zone 1 | | (02A480) | 14848 |
| | Reserved Zone 1 | | (02DE80) | 4096 |
| | Reserved Zone 2 | | (02EE80) | 64 |
| | Inner Disc Identifcation Zone (SDCB) | | (02EEC0) | 256 |
| | Reserved Zone 3 | | (02EFC0) | 64 |
| | Riference Code Zone | start 23,896mm | (02F000) | 32 |
| | Buffer Zone 1 | | (02F020) | 480 |
| | Control Data Zone | | (02F200) | 3072 |
| | Buffer Zone 2 | | (02FE00) | 512 |
| Data | Data Zone | start 24,000mm | (030000) | 2295104 max |
| Lead-out | Buffer Zone 3 | start 58,000mm (at full capacity) | (260540) max | 768 |
| Outer Drive Area | Outer Disc Identification Zone | | (260840) max | 256 |
| | Guard Zone 2 | | (260940) max | 4096 min |
| | Outer Disc Administration Zone | start 58,053mm | (261940) | 4096 |
| | Outer Disc Count Zone | start 58,096mm | (262940) | 4096 |
| | Outer Disc Test Zone | start 58,139mm | (263940) | 16384 |
| | Guard Zone 3 | start 58,310mm | (267940) | blank |

FIG.7

| Byte number | Content | Number of bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 to 18 | Reserved—All (00) | 2 |
| 19 to 26 | Disc Manufacturer ID | 8 |
| 27 to 29 | Media type ID | 3 |
| 30 | Product revision number | 1 |
| 31 | number of Physical format information bytes in use in ADIP | 1 |
| 32 | Reference recording velocity | 1 |
| 33 | Maximum recording velocity | 1 |
| 34 | Wavelength $\lambda_{IND}$ | 1 |
| 35 | normalized Write power dependency on Wavelength $(dP/d\lambda)/(P_{IND}/\lambda_{IND})$ | 1 |
| 36 | Maximum read power at reference velocity | 1 |
| 37 | $P_{IND}$ at reference velocity | 1 |
| 38 | $\beta_{target}$ at reference velocity | 1 |
| 39 | Maximum read power at maximum velocity | 1 |

FIG.8

| Byte number | Content | Number of bytes |
|---|---|---|
| 40 | $P_{IND}$ at maximum velocity | 1 |
| 41 | $\beta_{target}$ at maximum velocity | 1 |
| 42 | $T_{Top}(\geq 4)$ first pulse duration for $cm \geq 4$ at reference velocity | 1 |
| 43 | $T_{Top}(=3)$ first pulse duration for $cm=3$ at reference velocity | 1 |
| 44 | $T_{mp}$ umlti pulse duration at reference veloctiy | 12 |
| 45 | $T_{lp}$ last pulse duration at reference veloctiy | 1 |
| 46 | $dT_{Top}(\geq 4)$ first pulse lead time for $cm \geq 4$ at reference velocity | 2 |
| 47 | $dT_{Top}(=3)$ first pulse lead time for $cm=3$ at reference velocity | 8 |
| 48 | $dT_{le}$ 1$^{st}$ pulse leading edge correction for $cm=3$ at reference velocity | 3 |
| 49 | $T_{Top}(\geq 4)$ first pulse duration for $cm \geq 4$ at maximum velocity | 1 |

FIG.9

| Byte number | Content | Number of bytes |
|---|---|---|
| 50 | $T_{Top}(=3)$ first pulse duration for cm=3 at maximum velocity | 1 |
| 51 | $T_{mp}$ umlti pulse duration at maximum veloctiy | 1 |
| 52 | $T_{lp}$ last pulse duration at maximum veloctiy | 1 |
| 53 | $d_{Top}(\geq 4)$ first pulse lead time for cm≧4 at maximum velocity | 1 |
| 54 | $d_{Top}(=3)$ first pulse lead time for cm=3 at maximum velocity | 1 |
| 55 | $dT_{le}$ 1$^{st}$ pulse leading edge correction for cm=3 at maximum velocity | 1 |
| 56 to 247 | Reserved—All(00) | 192 |
| 248 to 251 | Start of Session | 4 |
| 252 to 255 | End of Session | 4 |
| 256 to 2047 | Reserved—All(00) | 1792 |

FIG.10

| | Description | Nominal radius in mm | PSN of the first Physical Sector | Number Of Physical Sector |
|---|---|---|---|---|
| | Initial Zone | start 22,000mm | (01D830) | 52304 nominal |
| | Inner Disc Test Zone | start 23,400mm | (02A480) | 2048 |
| | Inner Drive Test Zone | | (02AC80) | 12288 |
| | Guard Zone 1 | | (02DC80) | 512 |
| | Reserved Zone 1 | start 23,782mm | (02DE80) | 4096 |
| Lead-in | Reserved Zone 2 | start 23,886mm | (02EE80) | 64 |
| | Inner Disc Identification Zone (SDCB) | | (02EEC0) | 256 |
| | Reserved Zone 3 | | (02EFC0) | 64 |
| | Riference Code Zone | start 23,896mm | (02F000) | 32 |
| | Buffer Zone 1 | | (02F020) | 480 |
| | Control Data Zone | | (02F200) | 3072 |
| | Buffer Zone 2 | | (02FE00) | 512 |
| Data | Data Zone | start 24,000mm | (030000) | 2295104 max |
| | Buffer Zone 3 | start 58,000mm max | (260540) max | 768 |
| | Outer Disc Identification Zone | | (260840) max | 256 |
| Lead -out | Guard Zone 2 | | (260940) max | 4096 |
| | Reserved Zone 4 | start 58,053mm | (261940) | 4096 |
| | Outer Drive Test Zone | | (262940) | 12288 |
| | Outer Disc Test Zone | | (265940) | 2048 |
| | Guard Zone 3 | start 58,246mm end≥58,500mm | (266140) | 22400 nominal |

FIG.11

| Byte number | Content | Number of bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to(00) | 1 |
| 17 to 18 | Reserved—All(00) | 2 |
| 19 to 26 | Disc Manufacturer ID | 8 |
| 27 to 29 | Media type ID | 3 |
| 30 | Product revision number | 1 |
| 31 | number of Physical format information bytes in use | 1 |
| 32 | Recording velocity | 1 |
| 33 | Maximum read power at reference velocity | 1 |
| 34 | $P_{IND}$ at reference velocity | 1 |
| 35 | $\rho$ at reference velocity | 1 |
| 36 | $\varepsilon 1$ at reference velocity | 1 |
| 37 | $\varepsilon 2$ at reference velocity | 1 |
| 38 | $\gamma_{target}$ at reference velocity | 1 |
| 39 | Maximum read power at maximum velocity | 1 |

FIG.12

| Byte number | Content | Number of bytes |
|---|---|---|
| 40 | $P_{IND}$ at maximum velocity | 1 |
| 41 | $\rho$ at maximum velocity | 1 |
| 42 | $\varepsilon 1$ at maximum velocity | 1 |
| 43 | $\varepsilon 2$ at maximum velocity | 1 |
| 44 | $\gamma_{target}$ at maximum velocity | 1 |
| 45 | Maximum read power at intermediate velocity | 1 |
| 46 | $P_{IND}$ at intermediate velocity | 1 |
| 47 | $\rho$ at intermediate velocity | 1 |
| 48 | $\varepsilon 1$ at intermediate velocity | 1 |
| 49 | $\varepsilon 2$ at intermediate velocity | 1 |
| 50 | $\gamma_{target}$ at intermediate velocity | 1 |
| 51 | $T_{Top}$ first pulse duration | 1 |
| 52 | $T_{mp}$ umlti pulse duration | 1 |
| 53 | $dT_{Top}$ first pulse lead time | 1 |
| 54 | $dT_{era}$ erase lead time at reference velocity | 1 |
| 55 | $dT_{era}$ erase lead time at maximum velocity | 1 |
| 56 | $dT_{era}$ erase lead time at intermediate velocity | 1 |
| 57 to 255 | Reserved—All(00) | 199 |

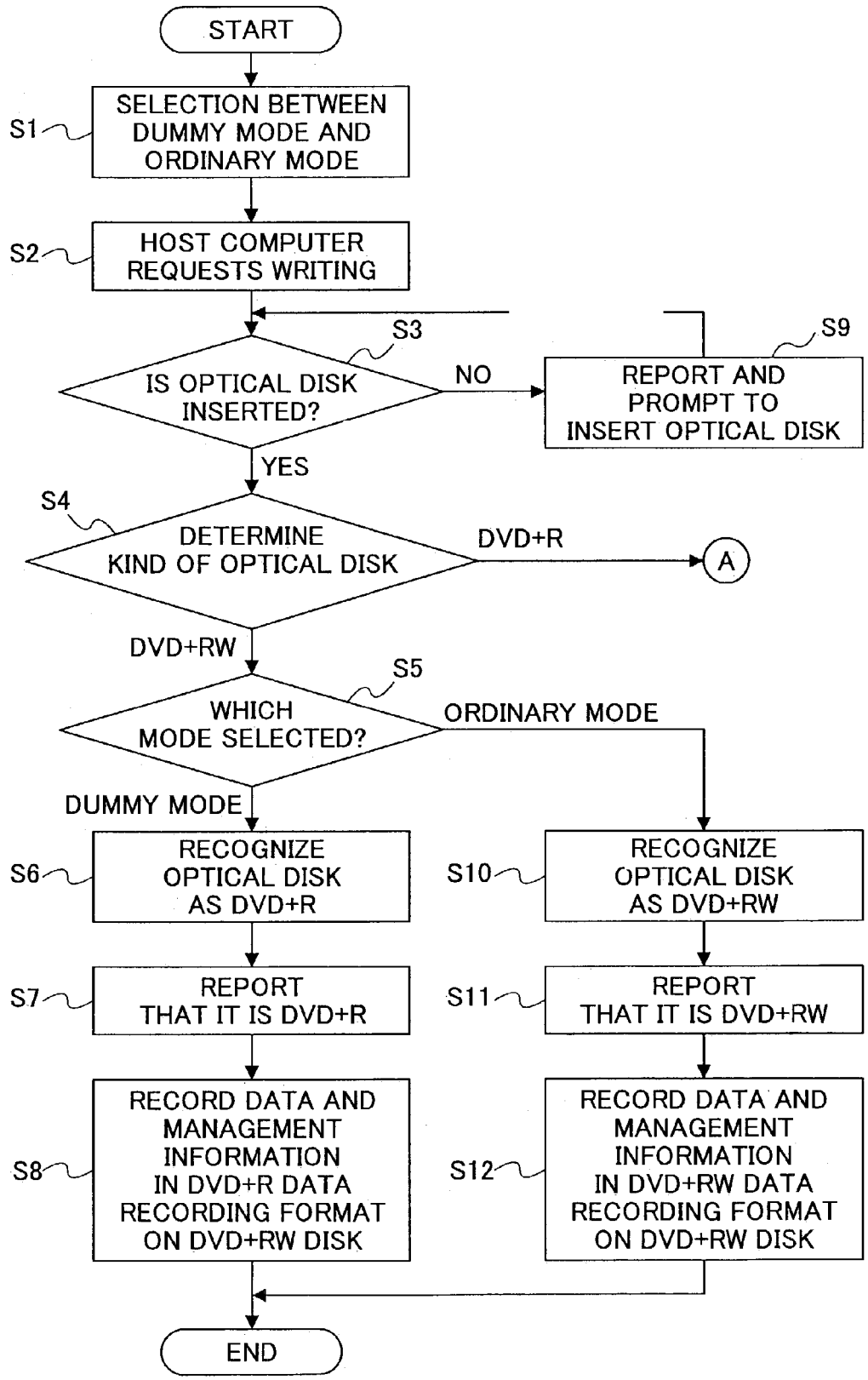

INFORMATION RECORDING APPARATUS, AN INFORMATION RECORDING METHOD, A PROGRAM, A RECORDING MEDIUM, AND AN INFORMATION RECORDING SYSTEM

BACKGROUND OF THE INVENTION

1. Field of the Invention

The present invention relates to an information recording apparatus for recording data on a write-once information recording medium that can be written on only once, such as a CD-R and a DVD+R, and a rewritable information recording medium, such as a CD-RW and a DVD+RW, an information recording method thereof, a program for a computer to carry out the information recording method, a computer-readable recording medium for storing the program, and an information recording system wherein the information recording apparatus records data on the write-once information recording medium and the rewritable information recording medium based on instructions from a host computer.

2. Description of the Related Art

As for the rewritable information recording media, on which data can be rewritten a large number of times, CD-RW, DVD+RW, and the like are available.

As for the write-once information recording media, on which data can be written only once, CD-R, DVD+R, and the like are available.

The write-once type information recording medium, such as a CD-R and a DVD+R, stores data by making a hole in a recording film on the disk with a high power laser light.

On the other hand, the rewritable type information recording medium, such as a CD-RW disk and a DVD+RW disk, stores data by a phase change method, wherein a reflectance difference between a crystalline state and an amorphous state is employed.

Physical properties, such as reflectance, of the write-once medium are different from physical properties of the rewritable medium. For this reason, a recording strategy for the write-once medium is different from a recording strategy for the rewritable medium. Here, the recording strategy refers to an output pattern of the laser light irradiated when recording data. Even when the same data are to be recorded, the output strength and irradiation period of the laser light for the write-once medium differ from those for the rewritable medium. There are cases where the rewritable medium, the reflectance of which is lower than the write-once media, cannot be reproduced by an information reproducing apparatus, such as a common CD player and a DVD player.

While reproducing data from a CD-RW disk is becoming possible for a large number of information reproducing apparatuses, reproducing data from a DVD+RW disk remains a problem, only about two thirds of the information reproducing apparatuses being able to so reproduce.

This is because the rewriting standards of DVD disks, such as DVD+RWs, have not been diffused widely, and there is a compatibility problem.

The write-once information recording media, such as CD-Rs and DVD+Rs, have a high reflectance, and reproduction is possible by nearly 100% of the common CD players and common DVD players.

Further, the data recording format for the CD-R disks and the CD-RW disks is prescribed by a standard called the Orange Book, and is compatible with stamped CD disks for reproduction. That is, the CD-Rs and the CD-RWs can be reproduced by common CD players, and the like.

There are several kinds of data recording formats for the information recording media. A format that provides the highest compatibility with the CD player is a recording format called disk-at-once, often referred to as "DAO".

According to the DAO format, all zones, including a lead-in zone, a program zone (program area), and a lead-out zone, are recorded in this sequence in one operation. A disk recorded according to the DAO format has the same structure as a stamped CD, and thus provides the highest compatibility with the commom CD player.

Other recording formats include track-at-once "TAO", where incremental recording is possible in the unit of tracks, there being a maximum of 99 tracks; session-at-once SAO, where recording is carried out session by session; and packet-write, where recording is carried out packet by packet.

The data recording format for the CD-R disk is fundamentally the same as that for the CD-RW disk. Therefore, it is often practiced that tentative recording is carried out on a CD-RW, and if successful, recording on a CD-R is carried out. In this manner, if an unsatisfactory result is obtained in the tentative recording, the CD-RW can be reused, before final recording on the CD-R is carried out.

In other words, a CD-RW disk is often used for proving (testing) purposes, and CD-R disks are often used for distribution.

As described above, in the case of CD, the data recording format for the write-once CD-R is the same as the rewritable CD-RW, and the above usage is possible.

On the other hand, in the case of DVD, the data recording format for a DVD+R disk is different from that for a DVD+RW disk. Unlike the CD, the DVD+R disk does not make a distinction between TAO and DAO. In the case of the DVD+R, data are recorded sequentially. In order that the DVD+R sequential data recording format may provide compatibility with a DVD-ROM disk drive, a portion is reserved for recording file information, and when closing a session, the file information is recorded in the reserved portion. Further, although the sequential recording on a DVD+R has to sequentially store data from the innermost circumference of the disk and outward, the sequence of data to be recorded can be interchanged by reserving two or more portions for recording. Further, recording is possible by a so-called multitrack-multisession method, wherein incremental recording is possible in the units of tracks and sessions.

In contrast, basic data recording formats for a DVD+RW disk are by tracks and by sessions. Unlike the DVD+R, the DVD+RW needs a formatting process wherein specific data are provided all over the disk, before the disk can be used for recording user data. The DVD+RW formatting process is a time consuming step, and user-unfriendly. Recently, a method has appeared, wherein only a certain minimum area is formatted initially, and the remainder is formatted in the background, such that data recording and reproduction are available quicker.

In this manner, a user can use the DVD+RW disk sooner than before, minimizing the time spent for formatting. Here, the disk can be ejected during the background formatting.

Here, a consideration is given to the fact that a DVD-ROM reproducing apparatus requires that a disk to be reproduced be filled with data to a certain extent. In view of this requirement, there is a method wherein a DVD+RW can be ejected only after dummy data are filled to the certain extent, in addition to a method wherein the disk can be ejected immediately.

As mentioned above, since the data recording format for the write-once DVD+R is different from the rewritable DVD+RW, a problem is that the task sharing between the CD-RW disk and CD-R disk for experimental use and distribution use respectively, often practiced as described above, is not available with the DVD+R and DVD+RW, due to the difference in the recording format. For this reason, in the case that a large amount of information recording media are consumed, like the research and development in connection with an information recording medium, the problem of the large consumption of the information recording media arises, without the task-sharing ability of performing experiments with a rewritable DVD+RW then distributing DVD+Rs with the same contents.

SUMMARY OF THE INVENTION

It is a general object of the present invention to provide an information recording apparatus, an information recording method, a program, a recording medium, and an information recording system that substantially obviate one or more of the problems caused by the limitations and disadvantages of the related art.

Specifically, the present invention aims at solving the above-mentioned problems, and providing an information recording medium on which data are recorded according to a certain data recording format prescribed by a standard, the data being reproducible by another data recording format.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an information recording apparatus, an information recording method, a program, a recording medium, and an information recording particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an information recording apparatus equipped with a means for recording data and management information (typically, a formatting disk control block, FDCB) on a rewritable information recording medium (typically, a DVD+RW) in the data recording format for the rewritable information recording medium (DVD+RW), the format being beforehand specified for the rewritable information recording medium (DVD+RW) as the standard, including a means for recording on the above-mentioned rewritable information recording medium (DVD+RW) the data and management information (typically, a session disk control block, SDCB) of a write-once information recording medium that can be written on only once (typically, a DVD+R) in the data recording format for the write-once information recording medium (DVD+R), the format being beforehand specified for the write-once information recording medium (DVD+R) as the standard.

The present invention further provides an information recording apparatus that operates in a mode opposite to the above. Specifically, the information recording apparatus equipped with a means for recording data and management information (typically, a session disk control block, SDCB) on a write-once information recording medium (typically, a DVD+R) in the data recording format for the write-once information recording medium (DVD+R), the format being beforehand specified for the write-once information recording medium (DVD+R) as the standard, including a means for recording on the above-mentioned write-once information recording medium (DVD+R) the data and management information (typically, a formatting disk control block, FDCB) of a rewritable information recording medium (typically, a DVD+RW) in the data recording format for the rewritable information recording medium (DVD+RW), the format being beforehand specified for the rewritable information recording medium (DVD+RW) as the standard.

The information recording apparatus of the present invention further provides a reporting means for reporting the kind of the information recording medium based on the management information recorded on the information recording medium.

The information recording apparatus is further provided with a selection means for selecting a data recording format from the write-once data recording format and the rewritable data recording format, and with a reporting means for reporting the kind of the information recording format based on the selection carried out by the selection means.

The above-mentioned selection means may be operated by an instruction from the outside.

Further, the present invention provides an information recording method, a program, a recording medium, and an information recording system, which jointly or severally realize the information recording of the present invention.

BRIEF DESCRIPTION OF THE DRAWINGS

FIG. 2 is a diagram showing a format of a session disk control block (SDCB) of a DVD+R that is a write-once information recording medium that can be written on only once;

FIG. 3 is a diagram showing a format of fragment items of a session item shown in FIG. 2;

FIG. 4 is a diagram showing a format of previous session items of the session item shown in FIG. 2;

FIG. 5 is a diagram showing a format of a formatting disk control block (FDCB) of a DVD+RW that is a rewritable information recording medium;

FIG. 6 is a diagram showing another example of the format of the DVD+R that is a write-once information recording medium that can be written on only once;

FIG. 7 is a diagram showing a format of a control data zone in a lead-in zone shown in FIG. 6;

FIG. 8 is a continuation to FIG. 7;

FIG. 9 is a continuation to FIG. 8;

FIG. 10 is a diagram showing another example of the format of the DVD+RW that is a rewritable information recording medium;

FIG. 11 is a diagram showing the format of the control data zone in the lead-in zone shown in FIG. 10;

FIG. 12 is a continuation to FIG. 11;

FIG. 13 is a flowchart showing a data recording process for the optical disk in the DVD+R/+RW drive system shown in FIG. 1.

DESCRIPTION OF THE PREFERRED EMBODIMENTS

In the following, embodiments of the present invention will be described with reference to the accompanying drawings.

Figure 1:
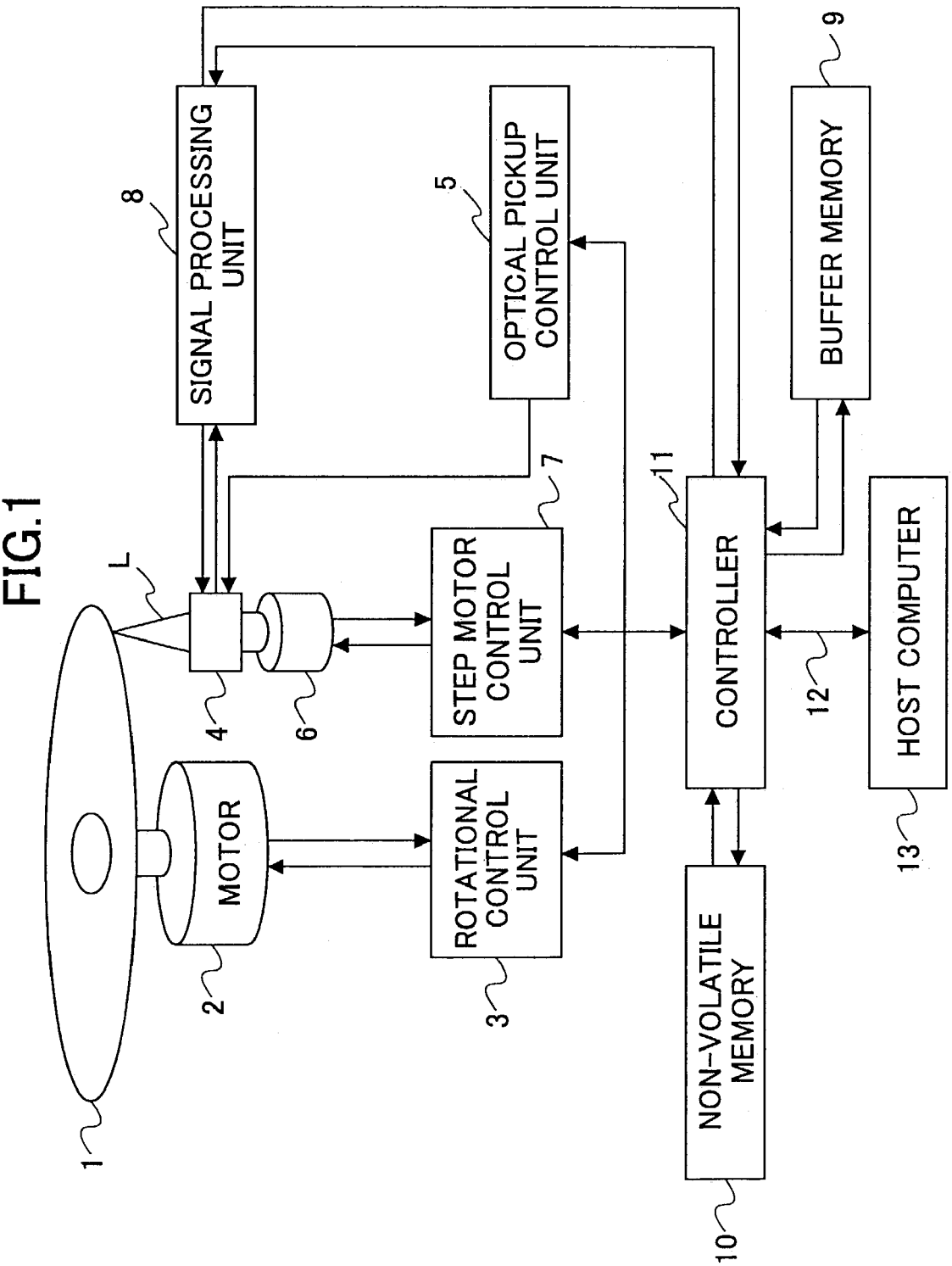
FIG. 1 is a block diagram showing the configuration of a DVD+R/+RW drive system according to an embodiment of the present invention.

FIG. 1 is a block diagram showing the configuration of a DVD+R/+RW drive system (information recording/reproducing apparatus) according to the embodiment of the present invention.

The DVD+R/+RW drive system is for recording data and reproducing the recorded data on an optical disk 1, such as a DVD-R, a DVD-RW, a DVD-RAM, a DVD-RAMWO, a DVD+R, and a DVD+RW, mounted on the DVD+R/+RW drive.

The DVD+R/+RW drive system includes a motor 2 for rotating the optical disk 1, a rotational control unit 3 for controlling the rotation of the motor 2, an optical pickup 4 for irradiating a laser light L on the optical disk 1 for data recording and reproducing, an optical pickup control unit 5 for controlling luminance of the laser light L, a positioner (tracking motor) 6 for moving the optical pickup 4 in the radial directions of the optical disk 1, a positioner (tracking motor) control unit 7 for controlling the rotational drive of the positioner (tracking motor) 6, a signal processing control unit 8 for controlling signals to and from the optical pickup 4, a controller 11 for controlling the whole drive system, a host computer 13, and an external interface 12 for exchanging signals between the controller 11 and the host computer 13 via ATAPI, SCSI, IEEE 1394, USB, and the like.

The DVD+R/+RW drive system further includes a non-volatile memory 10 serving as a domain for storing information such as the disk ID of the optical disk 1, start address information and end address information of the optical disk 1, the laser power at the time of recording, and a program for operating the controller 11; and a buffer memory 9 for temporarily storing data for the controller 11.

The host computer 13 includes a microcomputer consisting of a CPU, ROM such as flash ROM (FROM), RAM, etc. Recording and reproducing of data on the optical disk 1 by the DVD+R/+RW drive are controlled by the CPU executing the program stored in the ROM.

The information recording method of the present invention is performed by the controller 11 executing the program, and the process of the present invention is carried out, the program being installed in the non-volatile memory 10. This serves as a means for recording data and management information of a rewritable information recording medium on the rewritable information recording medium in the data recording format for the rewritable information recording medium, the format being beforehand specified as a standard of the rewritable information recording medium; and as a means for recording the data and management information of a write-once information recording medium on the rewritable information recording medium in the data recording format for the write-once information recording medium, the format being beforehand specified as a standard of the write-once information recording medium.

The controller 11 executing the program for making the computer perform the process of the present invention, as described above, also serves as a means for recording data and the management information of the write-once information recording medium on the write-once information recording medium in the data recording format for the write-once recording medium, the format being beforehand specified for the write-once information recording medium as the standard; and as a means for recording the data and the management information of the rewritable information recording medium on the write-once information recording medium in the data recording format for the rewritable information recording medium, the format being beforehand specified for the rewritable information recording medium as the standard.

Further, the controller 11 executing the program for making the computer perform the process of the present invention, as described above, also serves as a reporting means for reporting the kind of the information recording medium based on the management information recorded on the information recording medium, a selection means for selecting one of the data recording format for the rewritable information recording medium and the data recording format for the write-once information recording medium, and a reporting means for reporting the kind of the information recording format based on the result of the selection carried out by the selection means. Further, the non-volatile memory 10 serves as a holding means for holding the result of the selection carried out by the selection means.

Alternatively, the program may be installed in the host computer 13, and the CPU of the host computer 13 executes the processes of the information recording method of the present invention. This serves as the means described above. In this case, the host computer 13 also serves as the selection means and the reporting means. The non-volatile memory 10 serves as the holding means. The above-mentioned program can be stored in a computer-readable recording medium, such as an optical disk, a flexible disk, and a magneto-optical disk, and installed from the computer readable recording medium. Further, if a network is connected, the program can be installed through the network.

Next, the format of the management information when being recorded on a DVD+R disk in the data recording format for the write-once information recording medium, and the format of the management information when being recorded on a DVD+RW disk in the data recording format for the rewritable information recording medium are explained.

FIG. 2 is a diagram showing the format of a session disk control block SDCB of the management information of the DVD+R that is a write-once information recording medium. FIG. 3 is a diagram showing the format of fragment items included in a session item shown in FIG. 2. FIG. 4 is a diagram showing the format of a previous session item in the session item shown in FIG. 2.

The SDCB is provided in a place called the lead-in zone of the recording zone of the DVD+R, and contains information, such as information about all sessions of the DVD+R and Drive ID. The format of the SDCB is as shown in FIG. 2. The SDCB is equivalent to management information when recording data on the write-once information recording medium in the case of the DVD+R.

Especially important in the SDCB are session items, namely, Session Item 0 through Session Item N-1. Each session item includes fragment items and previous session items, formats of which are shown in FIG. 3 and FIG. 4, respectively.

The fragment items include the number of fragments, a start address, and an end address. The previous session items include the number of sessions, a start address, and end address. Further, as for the SDCB, the number of times of updating is set at 16 times. A DVD+R is a write-once type, and is provided with a capacity for only 16 pieces of SDCB update information.

FIG. 5 is a diagram showing the format of a formatting disk control block FDCB of the management information of the DVD+RW disk that is a rewritable information recording medium.

The FDCB is provided in a place called the lead-in zone of the recording zone of the DVD+RW, like the SDCB, and the state of a format, etc., are recorded. The FDCB contains information, such as the ID of the DVD+R/+RW drive and the optical disk, the state of the format and the last address recorded. The FDCB is equivalent to management information when recording data on the rewritable information recording medium in the case of the DVD+RW.

Unlike the above SDCB, this FDCB can be updated many times, because the DVD+RW is a rewritable medium, and the FDCB can be overwritten.

Next, another example of the format when recording data on a DVD+R in the data recording format for the write-once information recording medium, and the format when recording data on a DVD+RW in the data recording format for the rewritable information recording medium is explained.

FIG. 6 is a diagram showing another example of the format of the DVD+R that is a write-once information recording medium.

FIG. 7 through FIG. 9 are diagrams showing details of the format of the control data zone in the lead-in zone shown in FIG. 6. FIG. 7 is a continuation of FIG. 6, and FIGS. 8 and 9 are continuations of FIG. 7.

With reference to FIG. 7, "Disk Category and Version Number" is provided at the byte number 0, which contains identification information "1010" at bits b7 through b4, indicating that it is a DVD+R disk. This identification information is equivalent to management information when recording data on the write-once information recording medium in the case of the DVD+R.

FIG. 10 is a diagram showing another example of the format of the DVD+RW that is a rewritable information recording medium.

FIG. 11 and FIG. 12 show details of the control data zone in the lead-in zone shown in FIG. 10, wherein FIG. 12 is a continuation of FIG. 11.

With reference to FIG. 11, "Disk Category and Version Number" is provided at the byte position 0, which contains identification information "1001" at bits b7–b4, indicating that it is a DVD+RW disk. The identification information is equivalent to management information when recording data on the rewritable information recording medium in the case of the DVD+RW.

Next, a process of data recording performed by the DVD+R/+RW drive system on an optical disk is explained.

Figure 14:
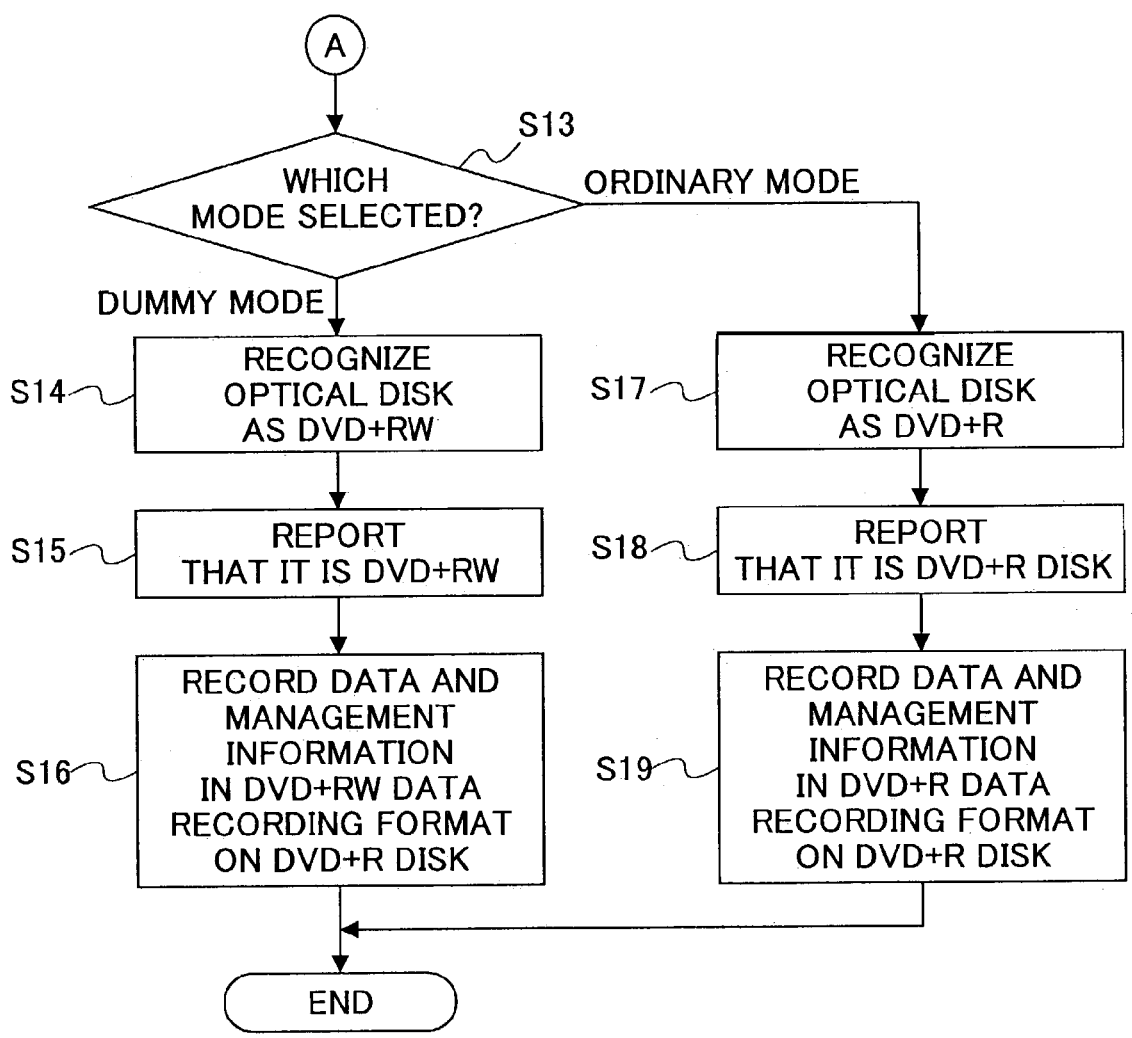
FIG. 14 is a continuation to FIG. 13.

FIG. 13 and FIG. 14 are flowcharts showing the data recording process on the optical disk in the DVD+R/+RW drive system shown in FIG. 1.

With reference to FIG. 13, at step S1, the CPU of the controller 11, or in the alternative case, the host computer 13, receives an instruction relative to a mode selected from a group of a dummy mode and an ordinary mode. Here, the dummy mode is a mode in which data and management information are recorded on a DVD+RW disk in the data recording format for a DVD+R disk, and data and management information are recorded on a DVD+R disk in the data recording format for a DVD+RW disk. Conversely, the ordinary mode is a mode in which data and management information are recorded on a DVD+RW disk in the data recording format for the DVD+RW disk, and data and management information are recorded on a DVD+R disk in the data recording format for the DVD+R disk.

The mode selection is carried out by an operation of a selection button provided in the DVD+R/+RW drive (illustration is omitted), and by an instruction (setting change process instruction) issued by the host computer 13. The non-volatile memory 10 stores the information about the selected mode, such that the information is held even after the power supply is disconnected, and the controller 11 can read the information and set up at the time of power supply reconnection, without the need for a user to perform the setup again.

At step S2, the controller receives a data writing (data recording) instruction from the host computer 13. Then, at step S3, it is determined whether an optical disk for data recording is inserted. If it is determined "negative", the process proceeds to step S9, where a display and request for insertion of an optical disk are provided to a user and the host computer, respectively. Then, the process returns to step S3.

Conversely, if it is determined "affirmative" at step S3, the process proceeds to step S4, wherein the kind of the inserted optical disk is determined, i.e., whether it is a DVD+R or a DVD+RW. The controller 11 determines the kind of the optical disk based on the management information of the inserted optical disk.

If it is determined that the inserted optical disk is a DVD+RW at step S4, the mode previously selected is determined at step S5. If the dummy mode is the selected mode, the inserted optical disk (DVD+RW) is considered to be a DVD+R disk at step S6. Then, at step S7, a display and a direction indicating that it is a disk in the recording format for the DVD+R disk are provided to the user and the host computer 13, respectively. At step S8, data and management information of the DVD+R disk are recorded on the DVD+RW disk in the data recording format for the DVD+R disk, such as the sequential writing method and the multi-session writing method, and the data recording process is ended.

In contrast, if, at step S5, it is determined that the ordinary mode is the selected mode, the inserted optical disk (DVD+RW) is considered to be a DVD+RW at step S10. Then, at step S11, a display and a direction indicating that it is a disk in the recording format for the DVD+RW disk are provided to the user and the host computer 13, respectively. Data and the management information of the DVD+RW disk are recorded on the DVD+RW disk in the data recording format for the DVD+RW disk, such as the sequential writing method, the random writing method, at step 12. Then, the data recording process is ended.

If it is determined that the kind of the inserted optical disk is a DVD+R at step S4, the process proceeds to step S13 shown in FIG. 14 (refer to a jump mark A in circle).

At step S13, the mode previously selected is determined. If it is determined that the selected mode is the dummy mode, the optical disk inserted is considered to be a DVD+RW at step S14. At step S15, a display and direction indicating that it is a disk in the data recording format for a DVD+RW disk are provided to the user and the host computer, respectively. Then, at step S16, data and the management information of the DVD+RW disk are recorded to the DVD+R disk in the data recording format for the DVD+RW disk, such as the sequential writing method and the random writing method, and the data recording process is ended.

Conversely, if, at step 13, it is determined that the selected mode is the ordinary mode, the optical disk inserted is considered to be a DVD+R disk at step S17. Then, at step S18, a display and direction indicating that it is a disk in the data recording format for a DVD+R are provided to the user and the host computer, respectively. At step S19, data and the management information for the DVD+R disk are recorded on the DVD+R disk in the data recording format for the DVD+R disk, such as the sequential writing method and the multi-session writing method, and the data recording process is ended.

In addition, if recording is carried out by a writer application, the file format of data can be sequential UDF in the case of the DVD+R disk, and random UDF in the case of the DVD+RW disk.

Thus, according to the present invention, the DVD+R/+RW drive system can record data and management information on a DVD+RW disk in the data recording format for a DVD+R disk, and vice versa. In this manner, when the data recording format for the DVD+R disk is studied and developed, a DVD+RW can be used as an object for debugging. That is, even when an error occurs, such as recording in an unintended data recording format, the DVD+RW can be used again, it being a rewritable type, eliminating waste of the DVD+R recording media.

Further, according to the present invention, it is easily determined whether the optical disk inserted in the DVD+R/+RW drive is a DVD+R or a DVD+RW. Further, an application program of the host computer can easily determine the data recording format for the optical disk inserted in the DVD+R/+RW drive, such that data can be recorded on the DVD+RW in the data recording format for a DVD+R, and vice versa.

Furthermore, according to the present invention, a setting by the DVD+R/+RW drive, or alternatively, by the host computer can easily be made as to whether data recording on an optical disk should be in the inherent (ordinary) data recording format for the inserted disk, or in a different data recording format. For example, when recording to a DVD+RW, a user can easily select whether data and management information are to be recorded in the data recording format for a DVD+R disk, or in the data recording format for a DVD+RW disk. In this manner, the data can be recorded on the optical disk in a data recording format that the user desires.

Further, the setting can be changed from the host computer through the external interface. Furthermore, since the information about the setting is held in the non-volatile memory, even if the power supply is shut down, the information is held, such that the user-friendliness is enhanced at the time of data recording by the user on the optical disk.

As explained above, according to the information recording apparatus, the information recording method, and the information recording system of the present invention, reproducible data recording is made possible on an information recording medium in a data recording format different from the data recording format specified beforehand as the standard for the information recording medium. Further, according to the program and the recording medium of the present invention, a computer can easily be arranged for carrying out the data recording function of the present invention.

Further, the present invention is not limited to these embodiments, but various variations and modifications may be made without departing from the scope of the present invention.

The present application is based on Japanese priority application No. 2002-175851 filed on Jun. 17, 2002 with the Japanese Patent Office, the entire contents of that are hereby incorporated by reference.

What is claimed is:

1. An information recording apparatus comprising:
   means for recording data and management information on a rewritable information recording medium in a rewritable information recording medium data recording format; and
   means for recording data and management information on the rewritable information recording medium in a write-once information recording medium data recording format,
   wherein the rewritable information recording medium data recording format is different than the write-once information recording medium data recording format.

2. An information recording apparatus comprising:
   means for recording data and management information on a write-once information recording medium in a write-once information recording medium data recording format; and
   means for recording data and management information on the write-once information recording medium in a rewritable information recording medium data recording format.

3. The information recording apparatus as claimed in claim 1, wherein the write-once information recording medium data recording format is associated with a DVD+R disk, and the rewritable information recording medium data recording format is associated with a DVD+RW disk.

4. The information recording apparatus as claimed in claim 1, wherein the management information of the write-once information recording medium data recording format is associated with a session disk control block, and the management information of the rewritable information recording medium data recording format is associated with a formatting disk control block.

5. The information recording apparatus as claimed in claim 1, further comprising reporting means for reporting the kind of the information recording medium based on the management information recorded on the information recording medium.

6. The information recording apparatus as claimed in claim 1, further comprising selection means for selecting one of the write-once information recording medium data recording format or the rewritable information recording medium data recording format.

7. The information recording apparatus as claimed in claim 6, further comprising reporting means for reporting the selected data recording format.

8. The information recording apparatus as claimed in claim 6, wherein the selection means carries out the selection based on an instruction input from an external source.

9. The information recording apparatus as claimed in claim 6, further comprising holding means for holding the selected data recording format.

10. An information recording method comprising the steps of:
    recording data and management information on a rewritable information recording medium in a rewritable information recording medium data recording format; and
    recording data and management information on the rewritable information recording medium in a write-once information recording medium data recording format,
    wherein the rewritable information recording medium data recording format is different than the write-once information recording medium data recording format.

11. A computer implemented method, comprising the steps of:
    recording data and management information on a rewritable information recording medium in a rewritable information recording medium data recording format, and recording data and management information on the rewritable information recording medium in a write-once information recording medium data recording format, wherein the rewritable information recording medium data recording format is different than the write-once information recording medium data recording format.

12. A computer-readable recording medium for storing a computer program for causing an apparatus to execute a method comprising the steps of:

recording data and management information on a rewritable information recording medium in a rewritable information recording medium data recording format, and recording data and management information on the rewritable information recording medium in a write-once information recording medium data recording format, wherein the rewritable information recording medium data recording format is different than the write-once information recording medium data recording format.

13. An information recording system, comprising:

a host computer; and an information recording apparatus comprising:

means for recording data and management information on a rewritable information recording medium in a rewritable information recording medium data recording format, and means for recording data and management information on the rewritable information recording medium in a write-once information recording medium data recording format, wherein the rewritable information recording medium data recording format is different than the write-once information recording medium data recording format.

* * * * *